(12) United States Patent
Kuroda

(10) Patent No.: US 8,027,240 B2
(45) Date of Patent: Sep. 27, 2011

(54) INFORMATION RECORDING MEDIUM, INFORMATION RECORDING DEVICE AND METHOD, AND COMPUTER PROGRAM

(75) Inventor: Kazuo Kuroda, Saitama (JP)

(73) Assignee: Pioneer Corporation, Tokyo (JP)

( * ) Notice: Subject to any disclaimer, the term of this patent is extended or adjusted under 35 U.S.C. 154(b) by 1270 days.

(21) Appl. No.: 11/596,077

(22) PCT Filed: May 9, 2005

(86) PCT No.: PCT/JP2005/008443
§ 371 (c)(1),
(2), (4) Date: Jan. 4, 2007

(87) PCT Pub. No.: WO2005/109431
PCT Pub. Date: Nov. 17, 2005

(65) Prior Publication Data
US 2008/0025193 A1    Jan. 31, 2008

(30) Foreign Application Priority Data

May 10, 2004 (JP) ................................. 2004-140340

(51) Int. Cl.
*G11B 7/24* (2006.01)

(52) U.S. Cl. ............... 369/275.3; 369/275.1; 369/275.2; 369/275.4

(58) Field of Classification Search ..... 369/275.1–275.4
See application file for complete search history.

(56) References Cited

U.S. PATENT DOCUMENTS

| | | | | |
|---|---|---|---|---|
| 2002/0080695 | A1* | 6/2002 | Horii et al. ................. | 369/47.16 |
| 2002/0186637 | A1* | 12/2002 | Van Woudenberg et al. ..... | 369/59.25 |
| 2005/0058034 | A1* | 3/2005 | Ando et al. ................. | 369/47.27 |
| 2005/0078577 | A1* | 4/2005 | Horie ......................... | 369/47.28 |

FOREIGN PATENT DOCUMENTS

| | | |
|---|---|---|
| JP | 2000-331412 | 11/2000 |
| JP | 2001-57022 | 2/2001 |

* cited by examiner

*Primary Examiner* — Will J Klimowicz
*Assistant Examiner* — Andrew Sadinowski
(74) *Attorney, Agent, or Firm* — Young & Thompson

(57) ABSTRACT

An information recording medium such as DVD-R, DVD-RW or the like is provided with a user information recording area in which user information can be recorded. The user information recording area has pre-recorded areas for preventing recording/reproduction of the user information, in a plurality of portions. The user information recording area is divided by the pre-recorded areas into a plurality of partial recording areas including a partial recording area smaller than a unit area in which record information of a read-only recording medium is recorded.

16 Claims, 9 Drawing Sheets

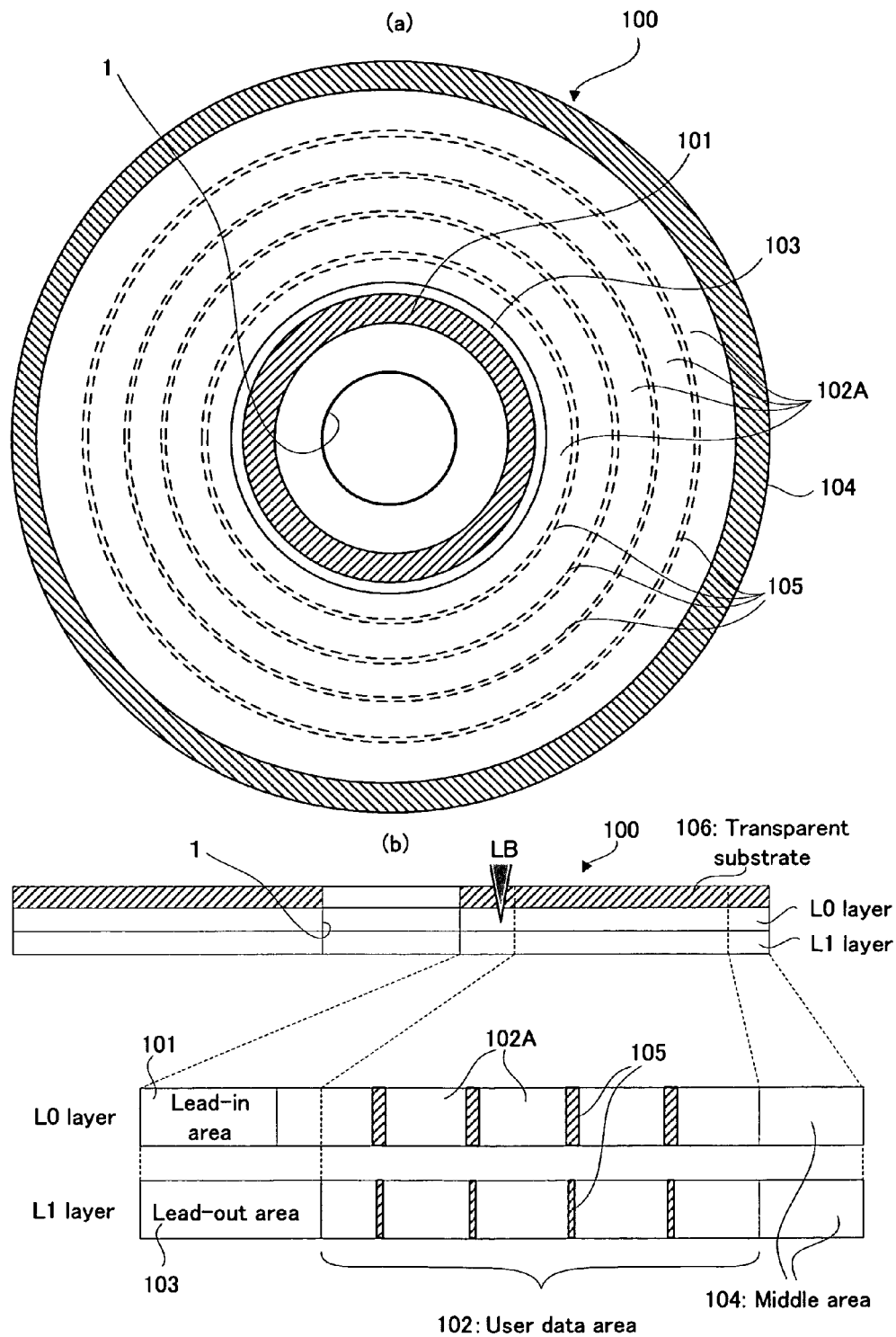

[FIG. 2]
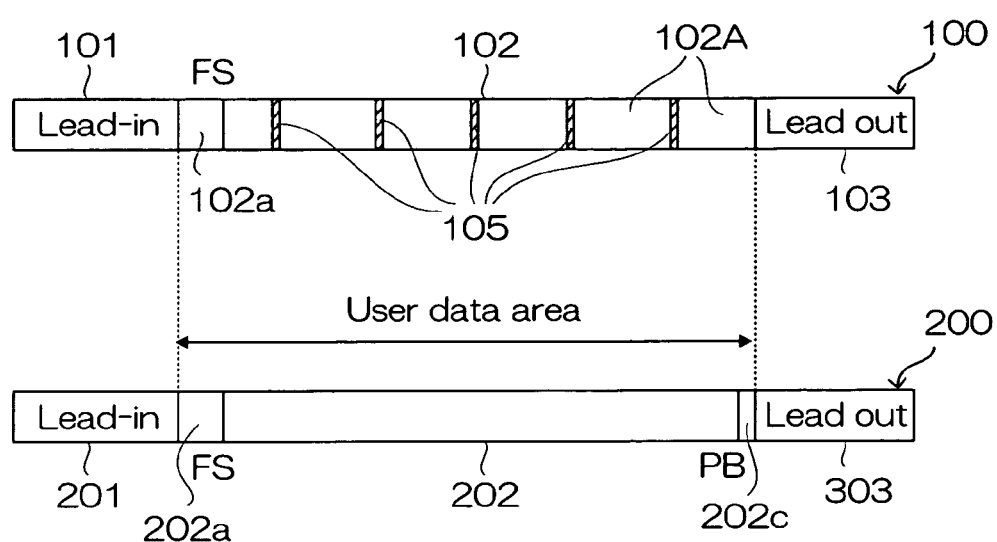

[FIG. 3]
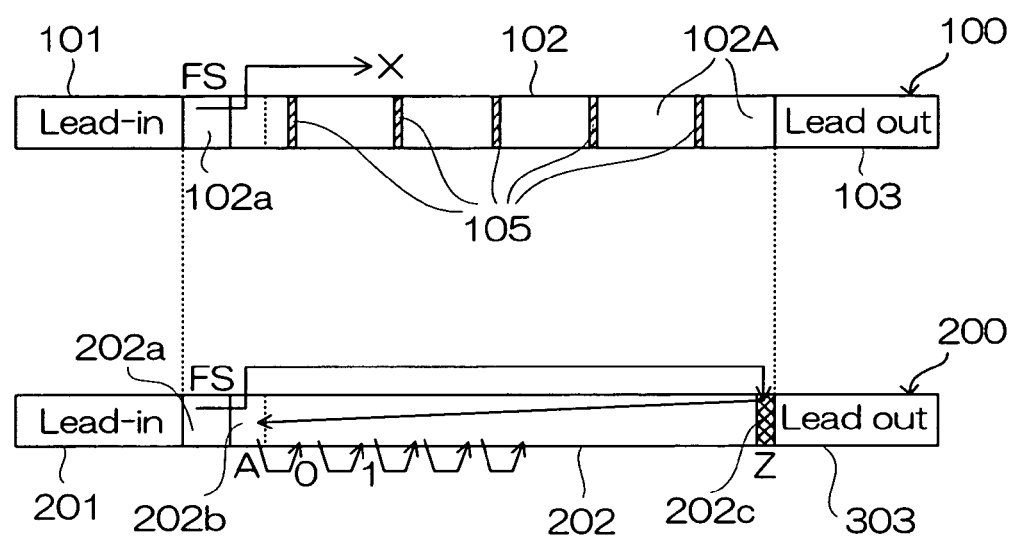

[FIG. 4]
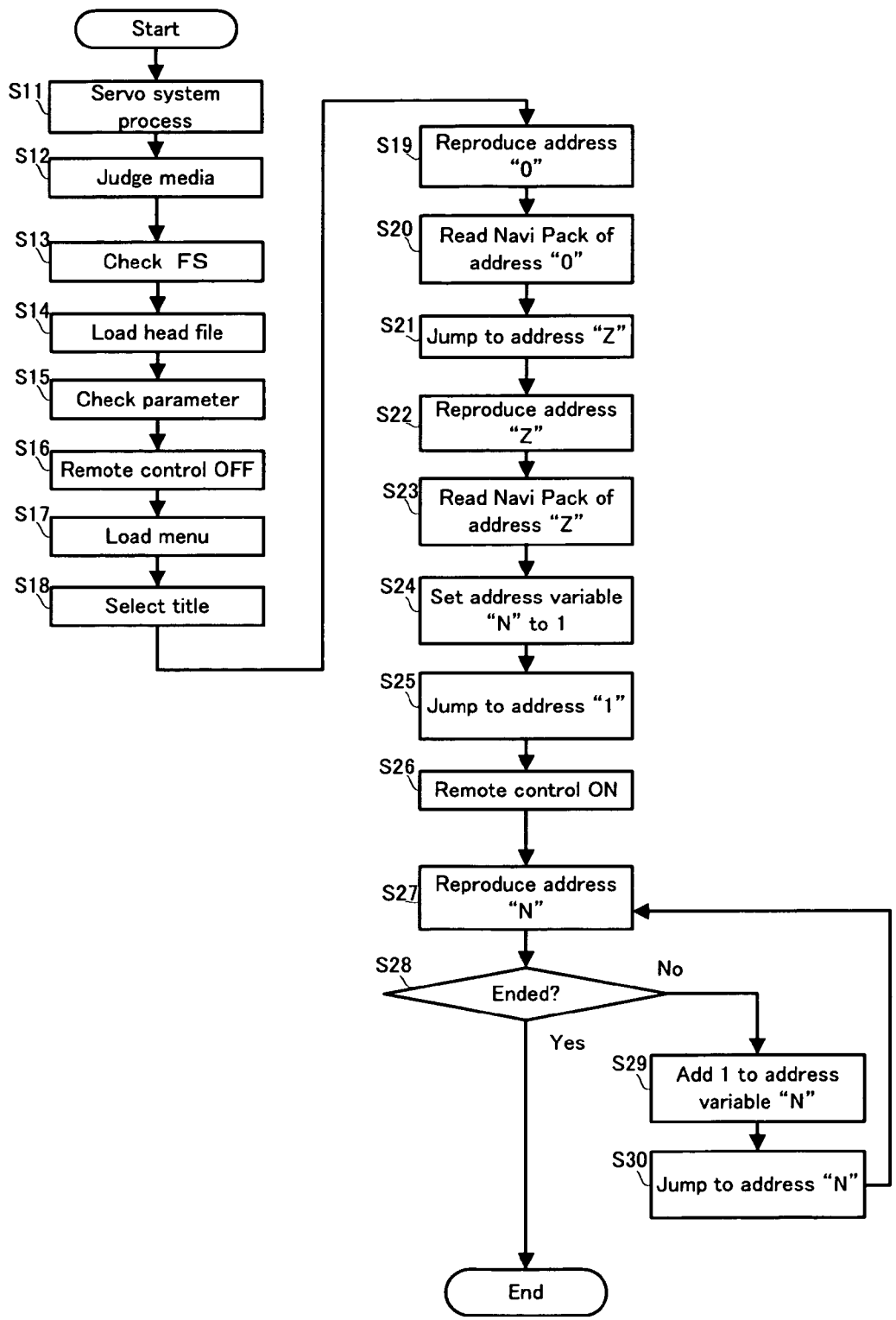

[FIG. 5]
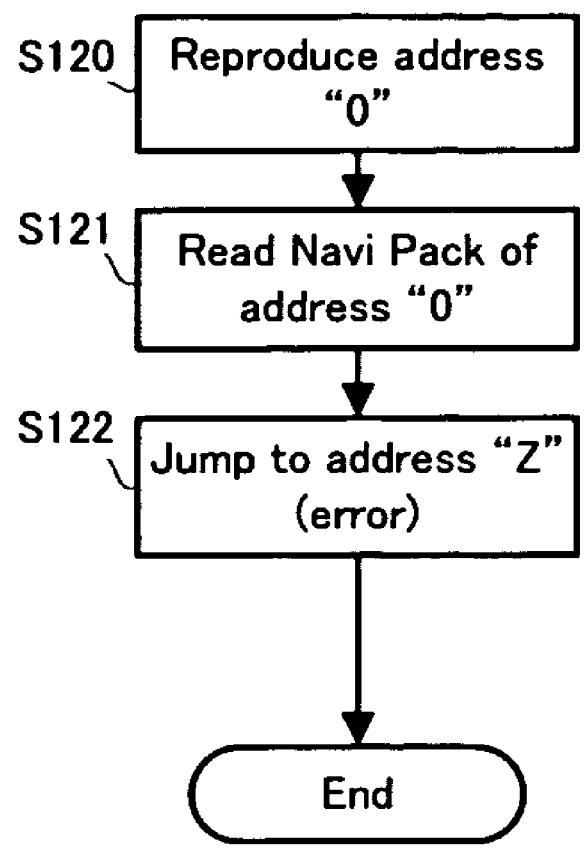

[FIG. 6]
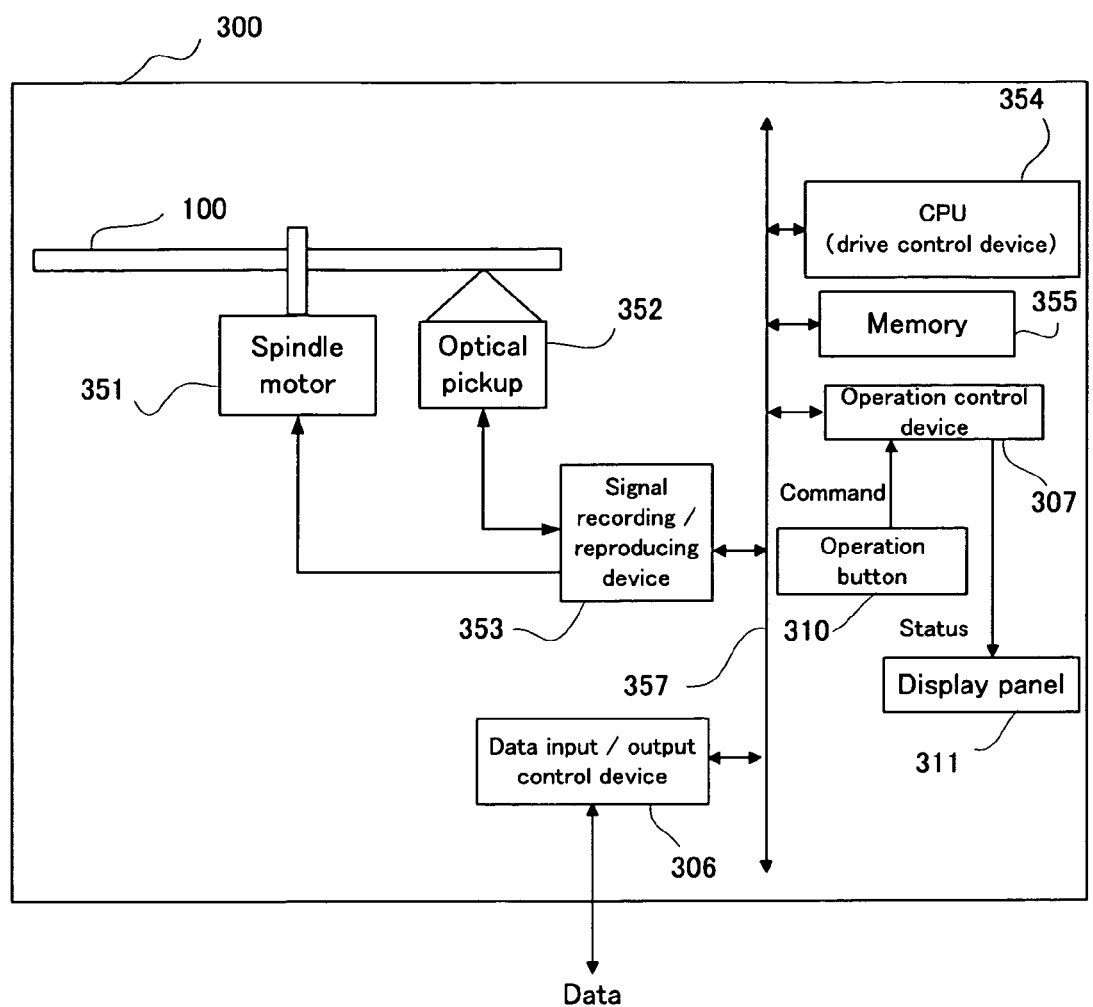

[FIG. 7]
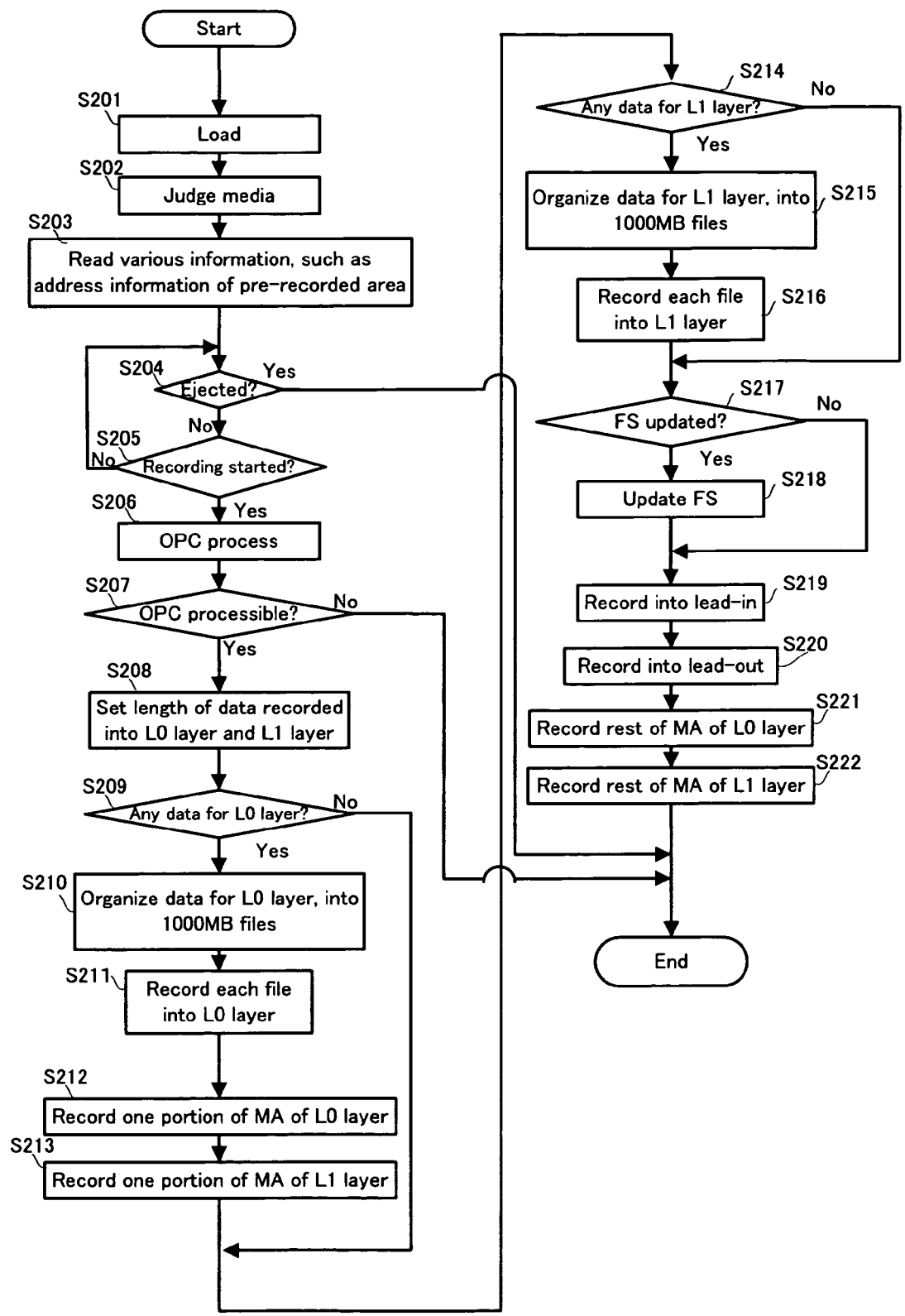

[FIG. 8]
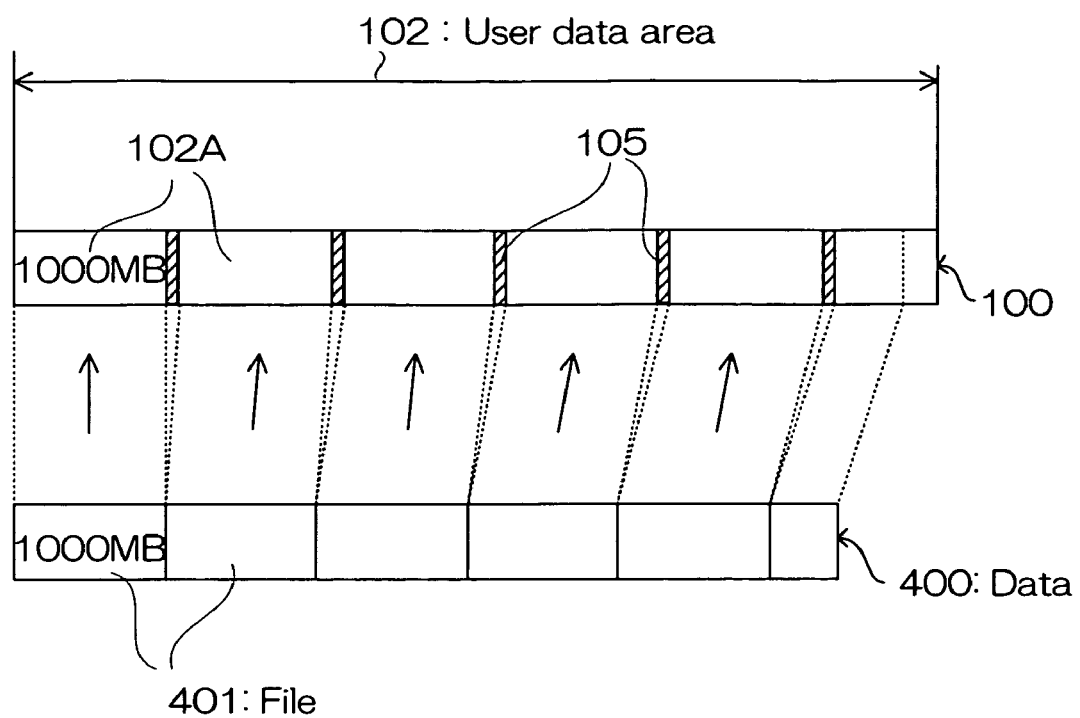

[FIG. 9]
(a)
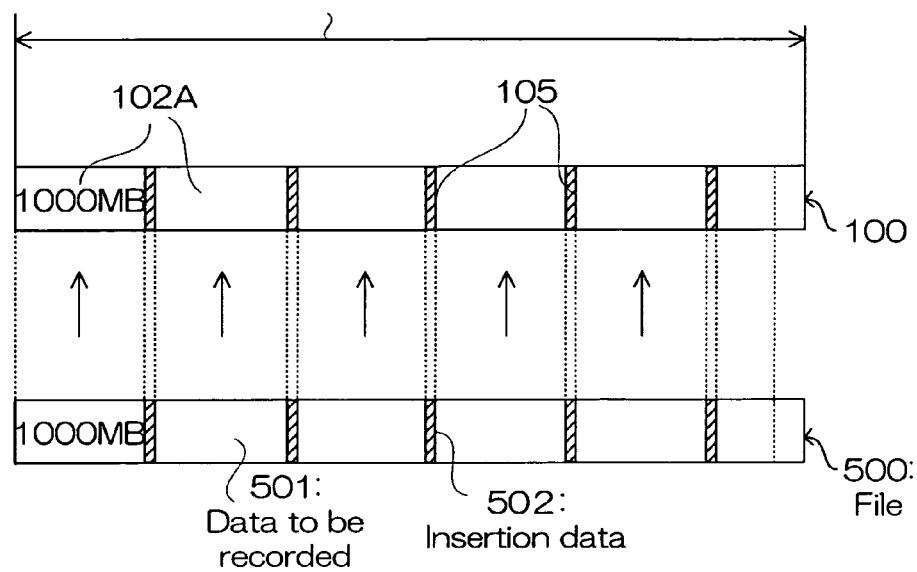
(b)
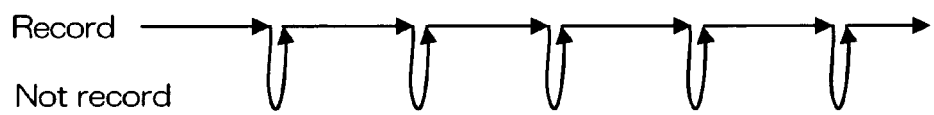

INFORMATION RECORDING MEDIUM, INFORMATION RECORDING DEVICE AND METHOD, AND COMPUTER PROGRAM

TECHNICAL FIELD

The present invention relates to an information recording medium, such as a DVD, an information recording apparatus, such as a DVD recorder, an information recording method, and a computer program, for example.

BACKGROUND ART

In an information recording medium, such as a CD (Compact Disc) and a DVD, a content protection function is incorporated. For example, a DVD format is constructed such that record contents can be reproduced only by a reproducing apparatus capable of performing decryption, by writing information about an encryption key in a lead-in area. Namely, it is designed such that each of a DVD video and DVD reproduction equipment has a "key" for performing the decryption, and only if the keys match, descrambling is performed, and video images can be normally reproduced.

However, lately, not only such a read-only DVD for recording contents (e.g. a DVD-Video), but also a DVD-R (Recordable) capable of writing only once, or a DVD-RW (Rewritable) capable of writing repeatedly are commercially available. Thus, if general disc data, including the encryption key information, is read from the DVD-Video or the like, as a RF signal, and it is hard-copied onto another recording medium, such as the DVD-R and the DVD-RW, the contents are illegally copied from the original DVD.

As a countermeasure against the illegal copying, a patent document 1 discloses a technology of forming embosses in an area out of the writable DVD where the encryption key information is recorded, in copying a DVD-Video or the like, such as the DVD-RW, to thereby make the area non-overwritable in advance. According to this method, the information is copied with the encryption key information lacked, so that it is extremely difficult to decrypt and normally reproduce the copied information.

Patent document 1: Japanese Patent Application Laid Open NO. 2000-331412

DISCLOSURE OF INVENTION

Subject to be Solved by the Invention

However, if the encryption performed on the DVD-Video or the like is broken and the contents are written into the DVD-RW or the like in the decrypted condition, there is such a technical problem that the reproduction can be performed, regardless of the encryption key information.

In order to solve the above-mentioned problem, it is therefore an object of the present invention to provide an information recording medium, an information recording apparatus, an information recording method, and a computer program, which enable the stronger protection of contents.

Means for Solving the Subject (Information Recording Medium)

Hereinafter, the information recording medium of the present invention will be explained.

The above object of the present invention can be achieved by an information recording medium provided with: a user information recording area in which user information can be recorded, the user information recording area having pre-recorded areas for preventing recording/reproduction of the user information, in a plurality of portions, the user information recording area being divided by the pre-recorded areas into a plurality of partial recording areas including a partial recording area smaller than a unit area in which record information of a read-only recording medium is recorded.

According to the information recording medium of the present invention, when the record information of the read-only (or reproduce-only) recording medium is copied into the user information recording area, the writing into the portions which are the pre-recorded areas, is forbidden or restricted. Thus, the copied record information becomes in such a condition that the information to be written is lacked or that unrelated information is written instead of the information to be written, in the pre-recorded areas. And the copied record information is physically divided by the pre-recorded areas into the respective partial recording areas. In contrast, the record information of the read-only recording medium adopts single extent, that is, the data structure in which a file is physically continuous and the file to be reproduced next is specified by a relative address. Thus, as described above, in dead-copying or hard-copying, if the data is lacked in the middle of the recording or some unrelated data is inserted in the middle, the single extent data structure is damaged in the condition after the copying, so that it becomes remarkably hard to perform the normal reproduction. As described above, the pre-recorded areas function to prevent the user information from being recorded onto or reproduced from the user information recording area.

In particular, by the partial recording area smaller than the unit area in which the record information is recorded on the read-only recording medium, the record data having a size of unit area is divided in the middle by the pre-recorded areas. If the entire data in one unit area is completely copied into one partial recording area, there is a possibility that the normal reproduction can be performed at least with regard to the file. However, in the present invention, such a situation can be prevented for the above-mentioned reason.

Therefore, it is prevented to reproduce the information copied from the read-only recording medium, even in the decrypted condition.

Moreover, in the user information recording area, a user can arbitrarily write the information into the portion other than the pre-recorded areas, so that it is possible to ensure the standard value of a user data capacity. Moreover, if it is designed not to record the information into the pre-recorded areas, the recording can be performed without greatly changing the normal writing method. Incidentally, with regard to this information recording medium, the normal reproduction can be performed after the writing, in the case of the data file in a multi extent format in which the presence of the divided areas is allowed.

As described above, on the information recording medium on which the user information recording area is divided by the pre-recorded areas into the plurality of portions, it is possible to protect the contents recorded on the read-only recording medium while maintaining compatibility. In one aspect of the information recording medium of the present invention, a minimum size of the plurality of partial recording areas is smaller than a maximum file size defined in a file system for managing the record information of the read-only recording medium.

According to this aspect, the size of at least one partial recording area is smaller than the file size defined in the file system for managing the record information of the read-only recording medium. Thus, if copied into the user information recording area, at least one portion of the file data of the record information of the read-only recording medium cannot be completely fitted into the partial recording area, so that it definitely becomes in the partially lacked condition due to the pre-recorded areas.

Therefore, it is prevented the situation that one entire file is copied into one partial recording area and that the file is normally reproduced.

In another aspect of the information recording medium of the present invention, a minimum size of the plurality of partial recording areas is less than $2^{30}$ Bytes.

The file size defined in the file system for managing the record information of the read-only recording medium is less than 1024 MBytes, i.e., $2^{30}$ Bytes, for example. Thus, if the size of the partial recording area is less than this value, it is possible to partially lack the file data of the read-only recording medium, which is copied into the user information recording area.

In another aspect of the information recording medium of the present invention, embossed pits are formed in advance in the pre-recorded areas.

According to this aspect, the pre-recorded areas are made non-overwritable by forming the embossed pits in advance in the areas. Thus, it is possible to make the reproduction control information not be written onto the information recording medium, out of the record information copied from the read-only recording medium.

In another aspect of the information recording medium of the present invention, pre-pits obtained by irradiation of recording laser are formed in advance in the pre-recorded areas.

According to this aspect, the pre-recorded areas are made non-overwritable by forming the pre-pits in advance in the areas. Thus, it is possible to make the reproduction control information not be written onto the information recording medium, out of the record information copied from the read-only recording medium. Incidentally, the pre-pits are written in a destructive writing method or an irreversible change recording method by heat or the like due to the irradiation of laser light.

In another aspect of the information recording medium of the present invention, the pre-recorded areas are data areas.

According to this aspect, the pre-recorded area belongs to the data area, and specifically, the writing is performed in advance as the embossed pits or the pre-pits, by which the writing is prevented, as described above. The "data area" herein is an area into which the data corresponding to the contents to be recorded is recorded, and the "user information recording area" of the present invention also belongs to the data area. The pre-recorded area functions to prevent the writing, regardless of the fact that it is originally one portion of the data area into which the data is to be written.

Thus, if the data is written into the user information recording area without the pre-recorded areas recognized, such as when the record information is copied from the read-only recording medium, the data is divided. Thus, it is possible to make the situation that the normal reproduction is difficult.

In another aspect of the information recording medium of the present invention, operation-forbidding information for making an operation instruction given to the partial recording areas invalid in a reproduction period of the pre-recorded areas and before the period, is written in at least one of the pre-recorded areas and an area which is outside the user information recording area.

According to this aspect, in the reproduction of the information copied from the read-only recording medium, the operation instruction given to the user information recording area in the reproduction period of the pre-recorded areas and before the reproduction period, is made invalid on the basis of the operation-forbidding information. Namely, if the operation instruction inputted to the reproducing apparatus during the above-mentioned period, and the reading is started from a reading position at the present time point, there is a possibility that the copied information is reproduced even partially. However, here, since the operation-forbidding information is written in advance so as to read it in the above-mentioned period or before that, such a situation is prevented.

Thus, it is possible to prevent the reproduction of the information copied from the read-only recording medium, more certainly.

In another aspect of the information recording medium of the present invention, reproduction end information for ending reproduction of information which is recorded in the user information recording area by jumping to a reproduction end area defined in advance, is written in the pre-recorded areas.

According to this aspect, in the reproduction of the information copied from the read-only recording medium, after the reading is performed in the pre-recorded areas in order to use the reproduction control information, the reproduction from the user information recording area is ended by jumping to the reproduction end area defined in advance, such as the lead-out area, on the basis of the reproduction end information.

Thus, it is possible to prevent the reproduction of the information copied from the read-only recording medium, more certainly.

In another aspect of the information recording medium of the present invention, information indicating addresses of the pre-recorded areas is recorded in advance.

According to this aspect, in the recording/reproduction on the information recording medium, it is possible to refer to the information indicating the addresses of the pre-recorded areas recorded in advance. Thus, in the normal information writing, it is possible to prevent the situation that the information is mistakenly written up to the pre-recorded area. Here, the "information indicating the addresses of the pre-recorded areas" may be each address itself of the pre-recorded areas, or may be an interval size of the pre-recorded areas. Moreover, it may be each address or interval size of the partial recording areas which are inextricably linked with the pre-recorded areas. The data indicating such information is written in advance in the lead-in area or the like, as the embossed pits or pre-pits obtained by the laser irradiation, or land pre-pits (LPP), or in wobble modulation, or the like.

Incidentally, even if such a recording method is adopted when the record information of the read-only recording medium is copied, in that case, the relative address is changed by inserting the data corresponding to the pre-recorded area, between the data written into the partial recording areas. Thus, the reproduction becomes remarkably hard. Moreover, with regard to the contents of the read-only recording medium, such as the DVD-Video, the reproduction thereof is prevented even if they are copied in this recording method because the file system is limited to UDF 1.02 and the multi extent is not allowed.

In an aspect in which the information indicating the addresses of the pre-recorded areas is recorded in advance, the information indicating the addresses may be encrypted.

In this case, it is possible to inform a particular user of each address of the pre-recorded areas. Thus, the addresses of the pre-recorded areas which are minimum necessary in writing the information such that it can be normally reproduced, are kept secret. By this, it is possible to prevent the copying from the read-only recording medium or the like, more certainly.

Incidentally, in this case, the encryption key is desirably stored in a portion different from the encrypted address information.

In another aspect of the information recording medium of the present invention, the information recording medium is provided with a plurality of recoding layers in each of which recording areas constituting one portion of the user information recording area are formed and which are mutually laminated, and the pre-recorded areas are disposed in positions opposed to each other in the plurality of recording layers.

According to this aspect, the pre-recorded areas are disposed in the positions opposed to each other in the plurality of recording layers. Thus, it is possible to perform the writing in the same sequence in any recording layer, which is convenient.

In an aspect in which the pre-recorded areas are disposed in the positions opposed to each other in the recording layers, the pre-recorded area in a recording layer to be firstly recorded, out of the plurality of recording layers, may be larger than the pre-recorded area in a recording layer to be recorded later which is opposed to the pre-recorded area in the recording layer to be firstly recorded, by such an extent that an error associated with a relative position shift can be absorbed.

By virtue of such construction, even if there is an error related to a shift in position, such as an eccentricity error and a bonding error, between the recording layers, when the pre-pits are written into the pre-recorded areas, the pre-pits can be correctly written into the pre-recorded areas, like for example, the recording is firstly performed in the L0 layer and then performed in the L1 layer. Namely, even if there is the shift in position, for example, when the writing is performed in the recording layer on the rear side, viewed from the laser irradiation side, the writing can be always performed by the laser irradiation through the portion where the writing into the recording layer on the front side is finished.

(Information Recording Apparatus)

The above object of the present invention can be also achieved by an information recording apparatus for recording information to be recorded onto an information recording medium provided with: a user information recording area in which user information can be recorded, the user information recording area having pre-recorded areas for preventing recording/reproduction of the user information, in a plurality of portions, the user information recording area being divided by the pre-recorded areas into a plurality of partial recording areas including a partial recording area smaller than a unit area in which record information of a read-only recording medium is recorded, the apparatus provided with: a writing device capable of writing the user information into the user information recording area; and a controlling device for controlling the writing device to write the user information into an area other than the pre-recorded areas out of the user information recording area.

According to the information recording apparatus of the present invention, it is possible to properly record the information onto the information recording medium of the present invention.

In the user information recording area of the information recording medium of the present invention, the area other than the pre-recorded areas is a substantially recordable area, i.e. the area that a user can arbitrarily write information. If the information is recorded onto the information recording medium of the present invention, it is necessary not to write the information into the pre-recorded areas. Thus, when the information is written by the writing device, the writing device is controlled by the controlling device to write the information only into the area other than the pre-recorded areas, out of the user information recording area. At that time, the controlling device controls it on the basis of the information indicating each address of the pre-recorded areas. At this time, the information indicating each address of the pre-recorded areas, may be stored in advance in the controlling device if it is known or fixed due to the standard or the like, or may be read from the information recording medium.

Incidentally, even the information recording apparatus of the present invention can adopt aspects corresponding to the various aspects of the above-mentioned information recording medium of the present invention, as occasion demands.

In one aspect of the information recording apparatus of the present invention, information indicating each of addresses of the pre-recorded areas is recorded in advance on the information recording medium, the information recording apparatus is further provided with a reading device for reading the information indicating each of addresses of the pre-recorded areas, and the controlling device controls the writing device to write the user information in the area other than the pre-recorded areas out of the user information recording area, on the basis of the information read by the reading device.

According to this aspect, the information indicating each address of the pre-recorded areas is recorded on the information recording medium, and is read in the writing onto the information recording medium, and is used for the writing performed away from the pre-recorded areas. As described above, if the address information about the pre-recorded areas is owned by the information recording medium itself, it is possible to obtain and use the address information for each information recording medium, so that it is possible to correctly obtain the address information even if it varies depending on the type of the information recording medium or the like.

In another aspect of the information recording apparatus of the present invention, the controlling device controls the writing device to divide the information to be recorded, into individual files each of which has a file size equal to or less than a size of partial recording areas in which writing is to be performed, out of the plurality of partial recording areas, and to write the individual files into the respective partial recording areas in which writing is to be performed.

According to this aspect, the information to be recorded is divided into several files, and written into the partial recording areas by the file unit. The size of each file is equal to or less than the size of the partial recording area into which it is to be written. Thus, the writing of the portion which cannot be fitted into the partial area, is performed on the pre-recorded area. Consequently, the situation that the data is partially lacked is prevented. Therefore, it is possible to properly perform the writing operation.

In another aspect of the information recording apparatus of the present invention, the controlling device controls the writing device to make one file by inserting data uninvolved in reproduction of the information to be recorded, into portions of the information to be recorded corresponding to the pre-recorded areas, and to write the file into the user information recording area.

According to this aspect, the data file with extra data inserted into the portions corresponding to the pre-recorded areas is prepared, and the data file is written into the user information recording area. At that time, the areas in which the data inserted to the file is supposed to be written, correspond to the pre-recorded areas, so that the inserted extra data is forbidden or restricted in the writing and is lacked. However, in exchange, the original information to be recorded is written so as to avoid the pre-recorded areas, due to the gaps or spaces in the portions corresponding to the pre-recorded areas, caused by the insertion of the data. Therefore, it is possible to properly perform the writing operation.

In an aspect in which the writing device is controlled to make the file by inserting the data into the portions of the information to be recorded corresponding to the pre-recorded areas, and to continuously write the file into the user information recording area, further, the controlling device may control the writing device to selectively write only a portion other than the data uninvolved in the reproduction of the information to be recorded, out of the file of the information to be recorded, into a corresponding area in the user information recording area.

In this case, the writing operation is not performed on the pre-recorded areas. The data supposed to be written into the pre-recorded areas is not related to the reproduction of the information to be recorded, so that mistakenly writing it into the position away from the pre-recorded areas, prevents the normal reproduction. Namely, by not writing the insertion data onto the information recording medium, it is possible to prevent such a situation and it is possible to certainly write only the originally necessary data into the partial recording areas.

(Information Recording Method)

The above object of the present invention can be also achieved by an information recording method of recording information to be recorded onto an information recording medium provided with: a user information recording area in which user information can be recorded, the user information recording area having pre-recorded areas for preventing recording/reproduction of the user information, in a plurality of portions, the user information recording area being divided by the pre-recorded areas into a plurality of partial recording areas including a partial recording area smaller than a unit area in which record information of a read-only recording medium is recorded, the method provided with: a writing process of writing the user information into an area other than the pre-recorded area out of the user information recording area.

The information recording method of the present invention achieves the same operation and effect as those of the above-mentioned information recording apparatus of the present invention. Incidentally, the present invention can adopt the same aspects as the various aspects of the above-mentioned information recording apparatus of the present invention, as occasion demands.

(Computer Program)

The above object of the present invention can be also achieved by a computer program of instructions for tangibly embodying a program of instructions executable by a computer provided in the above-mentioned information recording apparatus of the present invention (including its various aspects), the computer program making the computer function as at least one portion of the controlling device and the writing device.

According to the computer program of the present invention, the above-mentioned information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the above-mentioned information recording apparatus of the present invention, the computer program of the present invention can also adopt various aspects.

The above object of the present invention can be also achieved by a computer program product in a computer-readable medium for tangibly embodying a program of instructions executable by a computer provided in the above-mentioned information recording apparatus of the present invention (including its various aspects), to make the computer function as at least one portion of the controlling device and the writing device.

According to the computer program product of the present invention, at least one portion of the controlling device and the writing device of the present invention described above can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as at least one portion of the controlling device and the writing device of the present invention described above.

As explained above, according to the information recording medium of the present invention, the user information recording area is divided by the pre-recorded areas into the plurality of partial recording areas, so that it is possible to protect the contents recorded on the read-only recording medium while maintaining compatibility.

According to the information recording apparatus of the present invention, it is provided with: the writing device; and the controlling device, so that it is possible to properly record the information onto the information recording medium of the present invention.

Moreover, according to the information recording method of the present invention, it is provided with the writing process, so that it is possible to properly record the information onto the information recording medium of the present invention.

Moreover, according to the computer program of the present invention, it makes a computer function as the information recording apparatus of the present invention, so that it is possible to properly record the information onto the information recording medium of the present invention.

These effects and other advantages of the present invention will become more apparent from the following embodiment.

BRIEF DESCRIPTION OF DRAWINGS

FIGS. 1 are (a) a substantial plan view showing the basic structure of an optical disc in an embodiment of the information recording medium of the present invention, and (b) an outline cross sectional view of the optical disc and a schematic conceptual view showing a recording area structure in the radial direction in association with the cross sectional view.

FIG. 2 is a conceptual structure diagram (upper diagram) showing the data structure of the optical disc in the embodiment of the present invention and a conceptual structure diagram (lower diagram) showing the data structure of a ROM disc corresponding to the optical disc.

FIG. 3 is a conceptual view (upper view) showing the data reading procedure of the optical disc in the embodiment of the present invention and a conceptual view (lower view) showing the data reading procedure of the ROM disc corresponding to the optical disc.

FIG. 4 is a flowchart showing the reproduction operation procedure of normal contents on the ROM disc in the embodiment of the present invention.

FIG. 5 is a flowchart showing the reproduction operation procedure of contents copied on the optical disc in the embodiment of the present invention.

FIG. 6 is a block diagram showing the structure of a recording/reproducing apparatus as an information recording apparatus in the embodiment of the present invention.

FIG. 7 is a flowchart showing a recording operation procedure with respect to the optical disc, performed by the recording/reproducing apparatus in the embodiment of the present invention.

FIG. 8 is a conceptual view showing how to write data onto the optical disc, performed by the recording/reproducing apparatus in the embodiment of the present invention.

FIGS. 9 are (a) a conceptual view showing how to write data onto the optical disc an optical disc in a modified example associated with the embodiment of the present invention, and (b) a conceptual view showing the corresponding writing operation.

DESCRIPTION OF REFERENCE CODES

100 . . . optical disc, 200 . . . ROM disc, 101, 201 . . . lead-in area, 102, 202 . . . data area, 103, 203 . . . lead-out area, 104, 204 . . . middle area, 105 . . . pre-recorded area, 106 . . . transparent substrate, PB . . . video reproduction control information, FS . . . file system

BEST MODE FOR CARRYING OUT THE INVENTION

Hereinafter, the best mode for carrying out the present invention win be explained in each embodiment in order, with reference to the drawings.

The embodiment of the present invention will be explained with reference to FIG. 1 to FIG. 7.

(Structure of Optical Disc)

Firstly, with reference to FIG. 1, the basic structure of an optical disc in the embodiment of the present invention will be explained. FIG. 1(a) shows the basic structure of the optical disc having a plurality of recording areas in the embodiment of the information recording medium of the present invention, and FIG. 1(b) shows the outline cross section of the optical disc and a recording area structure in the radial direction in association with the cross section.

In FIG. 1(a) and FIG. 1(b), an optical disc 100 is an information recording medium on which recording can be performed only once or repeatedly, such as a DVD-R and a DVD-RW, for example. For example, its disc main body with a diameter of about 12 cm, is constructed from a L1 layer and a L1 layer, which are recording layers, laminated on a transparent substrate 106. On each recording surface of the L0 layer and the L1 layer, a track or tracks 10, such as a groove track and a land track, are placed, spirally or concentrically, centered on a center hole 1, for example. In the center, a user data area 102, as one example of the "user information recording area" of the present invention, is set to be sandwiched between buffer areas, on its inner and outer circumferential sides. The buffer area is an area to prevent a recording or reproduction position from deviating to the outside of the substrate. Here, the buffer areas indicate a lead-in area 101, a lead-out area 103, and a middle area 104. Namely, the recording surface of the L0 layer is divided into the lead-in area 101, the user data area 102, and the middle area 104, from the inner circumferential side. Moreover, the recording surface of the L1 layer is divided into the lead-out area 103, the user data area 102, and the middle area 104, from the inner circumferential side. In each of the areas, the data is divided by each sector to which an address is assigned, and 1 ECC (Error Correcting Code) block is constructed from each 16 sectors, wherein the 1 ECC block is a unit of error-correction process.

On such a two-layer type optical disc 100, depending on which layer of the L0 layer or the L1 layer has the focus position of laser light LB, irradiated from the transparent substrate 106 side, it is possible to select one of the recording layers and perform the recording/reproduction. Moreover, as the recording or reproduction procedure of the two-layer type optical disc 100, an opposite track path type, in which the recording or reproduction is performed in a direction from the inner to the outer circumferential side (e.g. from the lead-in area 101 to the middle area 104) of the L0 layer, and further in a direction from the outer to the inner circumferential side (e.g. from the middle area 104 to the lead-out area 103) of the L1 layer, is adapted. In the opposite track path type, when the scanning of the L0 layer is ended and the scanning of the L1 layer is started, there is no need to displace an optical pickup, located on the outermost circumference of the optical disc, to the innermost circumference, and it is only necessary to change a focal distance from the L0 layer to the L1 layer. Thus, the opposite track path type has an advantage that a changing time from the L0 layer to the L1 layer is shorter than a parallel track path type.

The lead-in area 101 is an area firstly accessed at the time of recording or reproduction of the optical disc 100. Inside thereof, there are set: a reference code area in which the encryption key information used for scrambling is recorded; and a control data area in which various types of control information is recorded.

The user data area 102 is an area to record therein data corresponding to the contents to be recorded. The data to be recorded includes image data, audio data, computer-readable program data, or the like.

Incidentally, in the embodiment, pre-recorded areas 105 are disposed in a plurality of portions within the user data area 102, so that the user data area 102 is divided into a plurality of partial recording areas 102A. The pre-recorded area 105 is formed in advance, as a non-overwritable area, by using embossed pits if the optical disc 100 is a DVD-RW, and by using pre-pits obtained by the irradiation of the recording laser if it is a DVD-R. Such pre-recorded areas 105 are disposed in positions opposed to each other in the L0 layer and the L1 layer. Moreover, the width of the pre-recorded area 105 in the L1 layer is narrower than that in the L0 layer, by the extent of and a bonding error and an eccentricity error between the recording layers.

The lead-out area 103 is an area following the end edge of the user data area 102 in the recording or reproduction, and there is recorded information indicating the lead-out area 103. Moreover, the middle area 104 has a basic function for preventing the recording or reproduction position for the L0 layer and the L1 layer from deviating to the outside of the substrate. The middle area 104 functions as a so-called "jump buffer area" for preventing the recording or reproduction position from deviating to the outside of the substrate in layer jump. Specifically, in the L0 layer, the information to be recorded, such as the contents, is recorded, and subsequently, a predetermined amount of buffer data is recorded into one portion of the middle area 104 of the L0 layer. Then, after layer jump from the middle area 104 of the L0 layer to the L1 layer, a predetermined amount of buffer data is written as one portion of the middle area 104 of the L1 layer, and subsequently, the information to be recorded is recorded in the L1 layer.

Next, with reference to FIG. 2 to FIG. 5, the structure and the operation of the characterizing portion of the optical disc 100 will be explained.

In both FIG. 2 and FIG. 3, the optical disc 100 in the embodiment is shown on the upper side, and a ROM disc 200 is shown on the lower side, corresponding to each other. FIG. 2 shows the data structure of each recording medium. Incidentally, the data having such a data structure is actually recorded on the two layers divided as explained in FIG. 1. FIG. 3 schematically shows a data reading procedure. FIG. 4 shows the reproduction operation procedure of normal contents, performed by the ROM disc 200, and FIG. 5 shows the reproduction operation procedure of the contents copied on the optical disc 100.

As shown in FIG. 2, the optical disc 100 is designed to have substantially the same basic structure as that of the reproduce-only (or read-only) ROM (Read Only Memory) disc 200, so that compatibility is maintained. Namely, the recording area of the ROM disc 200 is divided into a lead-in area 201, a user data area 202, a lead-out area 203, and a middle area 204, which correspond to the lead-in area 101, the user data area 102, the lead-out area 103, and the middle area 104 of the optical disc, respectively.

However, on the ROM disc 200, the content data is recorded in advance in the user data area 202. Then, along with the recording of actual data of the contents, a file system FS is written into a head area 202*a* of the user data area 202, and video reproduction control information PB for each content is written into a tail area 202*c* of the user data area 202.

Incidentally, the content data of the ROM disc 200 is written in accordance with UDF 1.02 and single extent, in which the file must be physically continuous. Moreover, the address in the contents is specified by using a relative address, and the address information is included in the video reproduction control information PB. Moreover, storage information about where various data is recorded, is managed in the file system FS. Incidentally, here, the ROM disc 200 is one example of the "read-only recording medium" of the present invention.

In contrast, the user data area 102 of the optical disc 100 is divided into the plurality of partial recording areas 102A by the pre-recorded areas 105. It is designed to equalize the size of each of the plurality of partial recording areas 102A and to make it smaller (e.g. 1000 MBytes) than the size of a unit recording area of the ROM disc 200, i.e. a file size (e.g. 1024 MBytes=$2^{30}$ Bytes) defined in the file system of the ROM disc 200. Moreover, the occupied area of all the pre-recorded areas 105 is set 9 MBytes or less. Thus, the user data area 102 has a size rounded to 8.54 GBytes, i.e. a size based on the standard.

Incidentally, in the embodiment, the control information or the like which functions to prevent the reproduction of the contents is written in the pre-recorded areas 105 or in the other areas, such as the lead-in area 101. For example, if a key for the remote control or the like is received between the start time of reading the lead-in area 101 and the start time of reading the pre-recorded area 105, the user data area 102 may be scanned to thereby reproduce the contents, in some cases. Thus, the control information for making an operation instruction invalid (i.e. not receiving the key during the reading operation or the like) is set as one example of the "operation-forbidding information" of the present invention. For setting the control information, the flag is set in these areas.

Thus, if the content data of the ROM disc 200 is dead-copied onto the optical disc 100, the copy data of the user data area 202 is written from an area 102*a*, with the file system FS as the head. However, the substantial recording area of the user data area 102 is the individual partial recording areas 102A, and the pre-recorded areas 105 are not physically rewritable. In other words, even if the hard copying or dead copying is performed, the contents of the ROM disc 200 are recorded onto the optical disc 100 only in such a condition that the data in the area corresponding to the pre-recorded area 105, falls off in its entirety and that they are divided into the respective partial recording areas 102A.

Moreover, the size of each of the partial recording areas 102A is smaller than the file size defined in the file system of the ROM disc 200, so that the data to be copied in each partial recording area 102A is less than one file size.

(Reproduction on Optical Disc)

By adopting such a structure, the reading operation on the optical disc 100 will be performed as follows, if the contents are copied from the ROM disc 200.

Firstly, the normal reproduction of the ROM disc 200 is performed in a procedure shown in FIG. 3 and FIG. 4, on a reproducing apparatus. Incidentally, here, it is assumed that the ROM disc 200 is a DVD-Video, and that the reproducing apparatus has a DVD-reproducible (or DVD-readable) structure. The reproducing apparatus may be constructed in the same manner as usual, and the illustration and the explanation thereof will be omitted. Incidentally, as the reproducing apparatus, it is constructed in the same manner as in a recording/reproducing apparatus 300 described later (refer to FIG. 6), and it is also possible to apply a recording/reproducing apparatus capable of supporting the ROM disc 200.

On the reproducing apparatus, for example, the insertion of the ROM disc 200 triggers performing a servo system process, such as focus positioning of the optical pickup (step S11). Then, various information is read from the lead-in area 201 out of the ROM disc 200, and on the basis of that, the media type of the inserted disc is judged (step S12). Here, it is known to be a DVD, so that subsequently, the file system FS is read from the area 202*a* and checked (step S13). At this time, the head address "A" of all the contents is obtained.

If it becomes clear that the format of the inserted disc is of a DVD-Video type by using the file system FS, the file of a data area 202*b* is loaded, wherein the data area 202*b* is the head of the user data area 202 shown in FIG. 4 and specified by the address "A" (step S14). After a parameter stored in this file is checked (step S15) and the OFF state of remote control described later is determined (step S16), a content menu is further loaded from the head file (step S17) and displayed on the reproducing apparatus. Then, from title selection and instruction performed by a user (step S18), the contents to be reproduced on the reproducing apparatus are determined.

Then, the data is reproduced from the head address "0" of the contents to be reproduced (step S19), and a Navi Pack corresponding to the address "0" is read (step S20). Then, in accordance with navigation information read from the Navi Pack, jumping is performed to an area represented by an address "Z" out of the user data area 202 (step S21), and the data, i.e. the video reproduction control information PB, is reproduced from the area 202*c* specified by the address "Z" (step S22).

Then, a Navi Pack corresponding to the address "Z" is read (step S23). After a variable N, representing the address of the data which is a reproduction target, is set to 1 (step S24), jumping is performed to an area represented by the address "N (i.e. 1)" out of the user data area 202 (step S25). At this time point, the remote control of the variable N is set to be in ON state (step S26), and after that, the data within the specified contents is sequentially reproduced, from the address "1"

next to the address "0". Namely, the data is reproduced from the address "N" (step S27), and if the reproduction of the data within the contents is not finished yet (step S28: No), 1 is added to the variable N (step S29). Then, jumping is performed to the area represented by the address "N" (step S30), and until the data reproduction of all the contents is ended (the step S28: Yes), the reproduction of the data from the address "N" is repeated. Incidentally, as is seen from the above-mentioned operation, the address (0, 1, ..., N) of the content data is a relative address.

As opposed to this, as shown in FIG. 2, the reproduction on the optical disc 100 onto which the content data of the ROM disc 200 is dead-copied, is performed on the reproducing apparatus in a procedure shown in FIG. 3 and FIG. 5.

The operation procedure on the reproducing apparatus in this case is the same as at the time of reproduction of the above-mentioned ROM disc 200 until the contents to be reproduced are selected and specified from the optical disc 100.

In FIG. 5, even afterward, in the same manner as in the case of the ROM disc 200, the data is reproduced from the head address "0" of the contents to be reproduced (step S120), and the Navi Pack corresponding to the address "0" is read (step S121). Then, in accordance with the read navigation information, it is tried to jump to the area represented by the address "Z" out of the user data area 202.

However, although the contents copied from the ROM disc 200 are written in the single extent, they are physically divided into the respective partial recording areas 102A, so that the reproduction thereof is remarkably hard. Thus, the jumping to the area represented by the address "Z" cannot be normally performed (step S122).

Moreover, as described above, the size of each of the partial recording areas 102A is smaller than the file size defined in the file system of the ROM disc 200. Thus, each file data is definitely divided by the pre-recorded areas 105 in the middle, and it will never be copied in the complete condition. Namely, the contents after the copying are damaged even in the data structure of the file unit, and even the partial file cannot be normally reproduced.

As a result, in this case, it is prevented to reproduce the contents, which are actually meaningful contents, from the optical disc 100. In the actual sequence, the normal operation becomes difficult at least after the reading of the file system.

Incidentally, here, after the reading of the file system, the reproduction is performed in the normal manner, up to the head address "A" of all the contents. However, in order to prevent that reproduction, it is only necessary to dispose the first pre-recorded area 105 in the recording or reproduction direction, as close to the file system area as possible. In that case, if infinite loop program data is written in advance in the pre-recorded area 105, it is possible to set the actual data of the contents unable to be accessed when the content sequence of the DVD-Video uses the pre-recorded area 105. Moreover, the data area to be loop-reproduced is not necessarily the pre-recorded area 105, and the loop may be performed after jumping to another proper area from the pre-recorded area 105, for example.

Alternatively, the control information which makes jumping to the lead-out area 103 may be written in the pre-recorded area 105 in advance, as one example of the "reproduction end information" of the present invention, and the reproduction may be ended when the content sequence of the DVD-Video uses the pre-recorded area 105.

If such control information is written in advance in the pre-recorded areas, even if one portion of the content data is reproduced, it is possible to end the reproduction when the scanning is performed up to the pre-recorded area 105, so that it is possible to ensure the content protection function.

Moreover, it is also possible to set the DVD-Video data after copied onto the optical disc 100, to surely access the pre-recorded areas 105 in which the control information is written. Namely, it is only necessary to record the control information which accesses to the data range corresponding to the pre-recorded area 105, onto the ROM disc 200 which is the DVD-Video.

Moreover, so as to display a message, such as "this data cannot be reproduced" when the pre-recorded area 105 is read, for example, the control information indicating that may be written in advance in the pre-recorded area 105. Incidentally, the information to be written into the pre-recorded area 105 may be of any type, and various kinds are possible, in addition to the above-mentioned examples. However, in order to protect the contents more certainly, it is preferably the control information which functions to prevent the reproduction of the dead-copied contents, or the like.

As described above, the embodiment is designed such that the content data is divided into the respective partial recording areas 102A if the dead-copying is performed from the ROM disc 200 to the optical disc 100, so that it becomes difficult to logically normally reproduce all the contents. Therefore, it is prevented to watch the contents illegally copied, and furthermore, it contributes the prevention of illegal copying, which enables the stronger protection of the contents. Moreover, such an effect is achieved just by providing the pre-recorded area 105.

By the way, if the optical disc 100 is a DVD-R or a DVD-R/W, the standard of its capacity is 8.54 GBytes, but in fact, it can be said that even 8.544 GBytes and 8.535 GBytes are within the standard (if the recording layer is a single layer, 4.70 GBytes is a standard value, and 4.704 GBytes and 4.695 Gbytes are within the standard). Namely, there is an allowable value of 9 MBytes. Thus, if the total capacity of the pre-recorded area 105 of the optical disc 100 is set with in 9 MBytes, the user recording capacity of the optical disc 100 is 8.54 GBytes, and the accessing is possible by DVD-Video data whose capacity is 8.54 GByte. If the recording layer is a single layer, the pre-recorded area may be set to be within the margin of the standard capacity, in the same manner.

Therefore, in the optical disc 100, it is possible to achieve the content protection function while maintaining the compatibility.

(Recording on Optical Disc)

So far, the aspect about the illegal copying of the optical disc 100 has been explained. The optical disc 100, however, is originally a recording medium on which a user arbitrarily writes the data, and it is desired to correctly perform the recording/reproduction with regard to proper copying, aside from the illegal copying. In this regard, in the optical disc 100, the user data area 102 is divided into the plurality of partial recording areas 102A by the pre-recoded areas 105, so that it is necessary to perform the sequential recording in the partial recording areas 102A, away from the pre-recorded areas 105. Moreover, the data to be recorded at that time needs to be written so that the division of the recording area by the pre-recorded areas 105 does not influence the file structure (i.e. needs to be written in the multi extent or the like, for example).

Moreover, the optical disc 100 has a narrower virtually writable area, by the amount of the pre-recorded areas 105, than that of the ROM disc 200. Thus, in the writing on the optical disc 100, it is important to obtain the address information about the pre-recorded areas 105. With regard to the address information about the pre-recorded areas 105, if it is recorded in advance in the lead-in area 101, for example, or fixed as a standard value, it can be known at the time of data writing, so that it is possible to correctly perform the writing.

Hereinafter, the specific method of recording information onto the optical disc 100 will be further explained with reference to FIG. 6. FIG. 6 shows the structure of a recording/reproducing apparatus.

(Structure of Information Recording Apparatus)

A recording/reproducing apparatus 300 in FIG. 6 has a function of recording information onto the optical disc 100 and of reading the information recorded on the optical disc 100, on the basis of the "information recording method" of the present invention, under the control of a CPU (Central Processing Unit), as one example of the "information recording apparatus" of the present invention. The recording/reproducing apparatus 300 is provided with: a spindle motor 351; an optical pickup 352; a signal recording/reproducing device 353; a CPU (drive control device) 354; a memory 355; a data input/output control device 306; an operation control device 307; an operation button 310; a display panel 311; and a bus 357. Out of them, the spindle motor 351, the optical pickup 352, the signal recording/reproducing device 353, the CPU (drive control device) 354 and the memory 355 may constitute a disc drive (hereinafter referred to as a drive, as occasion demands). Moreover, the data input/output control device 306, the operation control device 307, the operation button 310, and the display panel 311 may constitute a host computer (hereinafter referred to as a host, as occasion demands). Alternatively, the CPU (drive control device) 354 and the bus 357 may constitute a communication device.

The spindle motor 351 is a device for rotating and stopping the optical disc 100, and is constructed to operate upon accessing the optical disc. More specifically, the spindle motor 351 is constructed to rotate and stop the optical disc 100 at a predetermined speed, under spindle servo from a not-illustrated servo unit or the like.

The optical pickup 352 is a device for performing the recording/reproduction with respect to the optical disc 100, and is provided with a laser device, a lens, and the like. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 controls the spindle motor 351 and the optical pickup 352, to thereby perform the recording/reproduction with respect to the optical disc 100. More specifically, the signal recording/reproducing device 353 is provided with: a laser diode (LD) driver; a head amplifier; and the like, for example. The laser diode driver (LD driver) drives a not-illustrated semiconductor laser device located in the optical pickup 352. The head amplifier amplifies the output signal of the optical pickup 352, i.e. the reflective light of a light beam, and outputs the amplified signal. More specifically, the signal recording/reproducing device 353 drives the not-illustrated semiconductor laser device located in the optical pickup 352, in order to determine an optimum laser power in the recording and reproduction processes for the OPC pattern, together with a not-illustrated timing generator or the like, under the CPU 354, upon the OPC (Optimum Power Calibration) process. Incidentally, the signal recording/reproducing device 353 constitutes one example of the "writing device" of the present invention, together with the optical pickup 352.

The memory 355 is used in the general data processing and the OPC process or the like on the recording/reproducing apparatus 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as a recording device, i.e. firmware, is stored; a buffer used for compression/decompression of video data; a RAM area into which a parameter required for the operation of the program or the like is stored; and the like.

In the memory 355, writing software is stored, as one example of the "computer program" of the present invention. The writing software has a function as an authoring tool for the characteristic data process of the embodiment.

The CPU (drive control device) 354 is a device for controlling the entire recording/reproducing apparatus 300, and is connected to the signal recording/reproducing device 353 and the memory 355 through the bus 357, and is constructed to give an instruction to each controlling device. In general, software or firmware for operating the CPU 354 is stored in the memory 355. Incidentally, the CPU 354 constitutes one example of the "controlling device" of the present invention, together with the memory 355.

The data input/output control device 306 controls the input/output of the data from the exterior with respect to the recording/reproducing apparatus 300, to thereby perform storage to and export from the data buffer on the memory 355. If the input/output of the data is a video signal, the data input/output control device 306 compresses (encodes) the data received from the exterior in a MPEG format, for example, and outputs it to the memory 355, upon data inputting. Upon data outputting, it decompresses (decodes) the encoded data in the MPEG format or the like received from the memory 355, and outputs it to the exterior.

The operation control device 307 has a function of receiving an operation instruction to the recording/reproducing apparatus 300 and a function of transmitting display data onto the display panel 311. Specifically, it is constructed from a not-illustrated CPU and memory or the like, so as to transmit an instruction by the operation button 310, such as an instruction to record or reproduce, to the CPU 354, and to output the operation state of the recording/reproducing apparatus 300, such as during recording and during reproduction, to the display panel 311.

Such a recording/reproducing apparatus 300 is household-use recorder equipment for recording and reproducing video images. By executing a program stored in the memory 355, on the processor 354, the recording/reproducing apparatus 300 can perform the operation as the recorder equipment, i.e. recording a video signal from a broadcast reception tuner and an external connection terminal, onto a disc, and outputting the video signal reproduced from the disc to external display equipment, such as a television.

(Flow of Recording Operation performed by Information Recording Apparatus of Present Invention)

Next, with reference to FIG. 6 to FIG. 8, and the structure shown in FIG. 1 or FIG. 2, the recording operation onto the optical disc 100 performed by the recording/reproducing apparatus 300 will be explained. FIG. 7 shows a recording operation procedure with respect to the optical disc, performed by the recording/reproducing apparatus 300, as the embodiment of the information recording method of the present invention. FIG. 8 shows how to write data into the user data area 102.

If the optical disc 100 is inserted (step S201), a seek operation is performed by the optical pickup 352 under the control of the CPU 354, and the type of the optical disc, such as a DVD-R or RW, is judged (step S202). More specifically, it is judged by using the value of "Book Type" in management information physically recorded in the control data zone, for example.

Subsequently, the various management information necessary for the recording process on the optical disc 100, is obtained (step S103). By virtue of the management information, the address information about a recorded area, the number of recording layers, and whether the recording layer is of an opposite track path type, of a parallel track path type, or a single layer, are distinguished or identified.

Incidentally, particularly here, by using the management information, whether or not the lead-out area is formed in advance, and whether the pre-recorded areas 105 are formed from embossed pits or pre-pits obtained by the irradiation of recording laser, are distinguished or identified. At the same time, the start address and the end address of each of the pre-recorded areas 105 are obtained. These kinds of identification information can be obtained in advance if the standard of the optical disc 100 is determined, and may be stored in advance in the memory 355, separately from writing software, or as one portion thereof.

Then, it is judged whether or not the optical disc is ejected (step S204). Here, if it is not ejected (the step S204: No), moreover, it is judged whether or not an instruction to start the recording is given, on the drive (step S205). If the instruction to start the recording is given (the step S205: Yes), an OPC process of detecting an optimum recording laser power is performed (step S206). If the optimum recording laser power can be detected (the step S207: Yes), under the control of the CPU 354, the amount of information recorded into the L0 layer and the L1 layer is calculated, and a turn-around point in the L0 layer and a correspondence address in the L1 layer are calculated (step S208). At that time, a writing allowable value in the L1 layer is calculated on the basis of the start address and the end address of the pre-recorded areas 105, i.e. the size of the total occupied area of the pre-recorded areas 105.

Then, it is judged whether or not there is information to be recorded into the L0 layer (step S209). If there is the information to be recorded into the L0 layer (the step S209: Yes), firstly, data 400 to be recorded is organized into files 401, each of which is 1000 MBytes or less in size, by using the authoring tool stored in the memory 355 described above (step S210: refer to FIG. 8). Incidentally, the multi extent is applied to the files 401.

Then, the data is written into the L0 layer by the file unit, for example (step S211). Specifically, the CPU 354 controls the signal recording/reproducing device 353 and the optical pickup 352, so that the file data is written into each of the partial recording areas 102A, one by one, with the pre-recorded areas 105 avoided, in the user data area 102.

In this series of file writing operation, each of the address information about the pre-recorded areas 105 is already obtained, so that it is prevented to mistakenly write the file data to the pre-recorded area 105. Moreover, the size of each file 401 exactly matches the size of the partial recording area 102A, so that each file 401 is completely fitted or embedded in the partial recording area 102A. This is how the data 400 is recorded into the L0 layer.

Then, buffer data is added to one portion of the middle area 104 of the L0 layer (step S212). Moreover, after layer jump, buffer data is added as one portion of the middle area 104 of the L1 layer (step S213).

Then, it is judged whether or not there is information to be recorded into the L1 layer (step S214). If there is the information to be recorded into the L1 layer (the step S213: Yes), the data to be recorded is organized into the files, each of which is 1000 MBytes or less in size, by using the authoring tool stored in the memory 355 described above (step S215).

Then, as in the L0 layer, even in the L1 layer, the data is written by the file unit (step S216). Each file 401 is completely fitted or embedded in the partial recording area 102A, and the data is recorded into the L1 layer, as well.

As described above, by writing them as the files 401, each of which corresponds to the partial recording area 102A in size, even large-sized video contents or the like can be also recorded in the logically continuous condition.

After that, the normal process is performed. Firstly, it is judged whether or not the file system (FS) in the user data area 102 is to be updated (step S217), and if it is to be updated (the step S215: Yes), the file system is updated (the step S218).

Then, a finalize process is started, and the management information or the like is recorded into the lead-in area 101 (step S219), and buffer data is added into the lead-out area 103 (step S220). Then, buffer data is added to the remaining portion of the middle area 104 of the L0 layer (step S221). Then, after layer jump, buffer data is added to the remaining portion of the middle area 104 of the L1 layer (step S222).

Then, a series of sequential recording is ended.

As described above, the embodiment is designed such that the information to be recorded is divided into the individual files 401, each of which has the file size equal to or less than the size of the partial recording area 102A, and that it is written into the partial recording areas 102A by the file unit. Thus, the information is written onto the optical disc 100, without overwriting it into the pre-recorded areas 105 thereby losing it partially. In this case, the multi extent is applied to the file data written onto the optical disc 100, so that even if the division is performed between the files, it is possible to reproduce the data without any trouble.

Namely, in the above-mentioned construction, it is possible to properly record the information onto the optical disc 100.

(Modified Example of Recording Method on Optical Disc)

Alternatively, if the information to be recorded is data in a video recording format, which uses the information recording apparatus using UDF 2.0 and a multi extent file system, it may be recorded while it is divided by the pre-recorded areas 105. In this case, the data is recorded into the partial recording areas 102A as the multi extent, so that the reproduction can be normally performed, as in the above-mentioned case.

Moreover, the above-mentioned embodiment is designed such that the data of the information to be recorded is divided into the individual files, each of which has the file size equal to or less than the size of the partial recording area 102A. However, as another authoring method, one file 500 (refer to FIG. 9(*a*)) in which insertion data 502 uninvolved in the reproduction of the information is inserted, may be generated in each portion of the data 501 to be recorded which corresponds to respective one of the pre-recorded areas 105.

Specifically, meaningless data is written as the insertion data 502 in the portions corresponding to the pre-recorded areas 105, to thereby prepare the file 500. Then, as shown in FIG. 9(*a*), the file 500 is continuously recorded into the user data area 102. At this time, the areas where the insertion data 502 is to be written, correspond to the pre-recorded areas 105, so that the insertion data 502, which is extra data, is lacked because the writing to the pre-recorded area is forbidden or restricted. However, in exchange, the original information 501 to be recorded is written so as to avoid the pre-recorded areas 105, due to the gaps or spaces caused by the insertion data 502. Therefore, even in this case, it is possible to selectively record the information into the partial recording areas 102A.

Moreover, in the writing operation of writing the information to be recorded, as shown in FIG. 9(b), the writing operation may be not performed on the pre-recorded areas 105. In this case, the insertion data 502 to be written into the pre-recorded areas 105 is inserted into the information to be recorded, in order to generate the gaps or spaces corresponding to the pre-recorded areas 105, so that it is not necessary to actually write it. In fact, if it is mistakenly written into the partial recording areas 102A, that prevents the normal reproduction. Namely, by stopping the writing of the insertion data 502, it is possible to prevent such a situation.

Incidentally, even if it is tried to copy the contents of the ROM disc 200 in this recording method, it is hardly possible to perform the recording in such a condition that the normal reproduction can be performed. Namely, with regard to the DVD-Video contents, the file system is limited to UDF 1.02 and the multi extent is not allowed. Thus, the fact that the data is divided, causes some trouble. Additionally, the relative address is used in the DVD-Video contents; however, if the data due to the pre-recorded areas 105 is inserted in the middle on the basis of the recording method, the relative address is changed, which makes it remarkably difficult to perform the normal reproduction.

Moreover, even if the code of the DVD-Video contents is decrypted, the decoded data is to be constructed from the files in units of 1024 MBytes, on the basis of the standard. In contrast, the size of the partial recording area 102A is 1000 MBytes, so that the data is always partially lacked from each and every file, which prevents the complete reproduction.

The present invention has been explained by illustrating the embodiment, however, various changes may be made, other than the above mentioned embodiment, with respect to the information recording medium, the information recording apparatus and method, and the computer program of the present invention. For example, the term "non-overwritable" for the pre-recorded area of the information recording medium of the present invention includes not only the case that it cannot be written at all, but also the case that it is physical rewritten to the extent that the complete reproduction is impossible.

Incidentally, according to the above-mentioned embodiment, it shows the example that all the divided partial recording areas are smaller than the unit area in which the record information of the read-only recording medium is recorded; however, it is also possible that at least one partial recording area is smaller than the unit area. Moreover, in this case, it is possible to surely prevent the reproduction of the illegal copying, by forbidding the response of remote control or key operation, to thereby end the reproduction in the divided areas, or by loop-reproducing in the divided areas, in order that the reproducing apparatus definitely performs the reproduction in the partial recording area smaller than the unit area.

Moreover, in the information recording medium of the present invention, the lead-in area, the lead-out or middle area may be further segmentized. Moreover, in the case of the two-layer type optical disc, the parallel method may be adopted, as well as the above-mentioned opposite method, as the recording/reproducing method. Moreover, the information recording medium of the present invention is not limited to a two-layer single sided type, i.e., a dual layer type, but may be a two-layer double sided type, i.e., a dual layer double sided type. Furthermore, the recording layer is not limited to the two recording layers, as described above, but may be a single layer, or three or more layers.

In the above-mentioned embodiment, the optical disc, such as a two-layer type DVD-R or DVD-R/W, is explained as a specific example of the information recording medium of the present invention. The present invention, however, can be applied to other types of information recording media, for example, a large-capacity recording medium, such as a Blue-ray disc.

The present invention is not limited to the above-described embodiment, and various changes may be made, if desired, without departing from the essence or spirit of the invention which can be read from the claims and the entire specification. An information recording medium, an information recording apparatus, an information recording method, and a computer program, which involve such changes, are also intended to be within the technical scope of the present invention.

INDUSTRIAL APPLICABILITY

The information recording medium, the information recording apparatus and method, and the computer program according to the present invention can be applied to a high-density recording medium, such as a DVD, and also applied to an information recording apparatus, such as a DVD recorder. Moreover, they can be applied to an information recording apparatus or the like, which is mounted on or can be connected to various computer equipment for consumer use or business use, for example.

The invention claimed is:

1. An information recording medium comprising:
a user information recording area in which user information can be recorded,
said user information recording area having pre-recorded areas in which recording/reproduction of the user information is prevented, said user information recording area being divided by the pre-recorded areas into a plurality of partial recording areas including a partial recording area, smaller than a unit area, in which record information of a read-only recording medium is recorded, the unit area having a size of an area on the information recording medium in which a size of data for recording or reproducing is recorded,
wherein operation-forbidding information invalidates an operation instruction by a user that is intended for the user information recorded in the partial recording areas in a reproduction period when data are recorded in the pre-recorded areas and before the reproduction period, the operation-forbidding information being written in at least one of the pre-recorded areas and an area which is outside said user information recording area.

2. The information recording medium according to claim 1, wherein a minimum size of each of the plurality of partial recording areas is smaller than a maximum file size defined in a file system for managing the record information of the read-only recording medium.

3. The information recording medium according to claim 1, wherein a minimum size of each of the plurality of partial recording areas is less than $2^{30}$ Bytes.

4. The information recording medium according to claim 1, wherein embossed pits are formed in advance in the pre-recorded areas.

5. The information recording medium according to claim 1, wherein pre-pits obtained by irradiation of recording laser are formed in advance in the pre-recorded areas.

6. The information recording medium according to claim 1, wherein the pre-recorded areas are data areas.

7. The information recording medium according to claim 1, wherein reproduction end information for ending reproduction of information which is recorded in said user information recording area by jumping to a reproduction end area defined in advance, is written in the pre-recorded areas.

8. The information recording medium according to claim 1, wherein information indicating addresses of the pre-recorded areas is recorded.

9. The information recording medium according to claim 8, wherein the information indicating the addresses is encrypted.

10. The information recording medium according to claim 1, wherein
said information recording medium comprises a plurality of recoding layers in each of which recording areas constituting one portion of said user information recording area are formed and which are mutually laminated, and
the pre-recorded areas are disposed in positions opposed to each other in the plurality of recording layers.

11. The information recording medium according to claim 10, wherein the pre-recorded area in a recording layer to be firstly recorded, out of the plurality of recording layers, is larger than the pre-recorded area in a recording layer to be recorded later which is opposed to the pre-recorded area in the recording layer to be firstly recorded, by a size corresponding to an error associated with a relative position shift.

12. An information recording apparatus for recording information to be recorded onto an information recording medium comprising: a user information recording area in which user information can be recorded, said user information recording area having pre-recorded areas in which recording/reproduction of the user information is prevented, said user information recording area being divided by the pre-recorded areas into a plurality of partial recording areas including a partial recording area, smaller than a unit area, in which record information of a read-only recording medium is recorded, the unit area having a size of an area on the information recording medium in which a size of data for recording or reproducing is recorded,
wherein operation-forbidding information invalidates an operation instruction by a user that is intended for the user information recorded in the partial recording areas in a reproduction period when data are recorded in the pre-recorded areas and before the reproduction period, the operation-forbidding information being written in at least one of the pre-recorded areas and an area which is outside said user information recording area,
said information recording apparatus comprising:
a writing device capable of writing the user information into said user information recording area; and
a controlling device for controlling said writing device to write the user information into an area other than the pre-recorded areas out of said user information recording area.

13. The information recording apparatus according to claim 12, wherein
information indicating each of addresses of the pre-recorded areas is recorded on said information recording medium,
said information recording apparatus further comprises a reading device for reading the information indicating each of addresses of the pre-recorded areas, and
said controlling device controls said writing device to write the user information in the area other than the pre-recorded areas out of said user information recording area, on the basis of the information read by said reading device.

14. The information recording apparatus according to claim 12, wherein said controlling device controls said writing device to divide the information to be recorded, into individual files each of which has a file size equal to or less than a size of partial recording areas in which writing is to be performed out of the plurality of partial recording areas, and to write the individual files into the respective partial recording areas in which writing is to be performed.

15. An information recording method of recording information to be recorded onto an information recording medium comprising: a user information recording area in which user information can be recorded, said user information recording area having pre-recorded areas in which recording/reproduction of the user information is prevented, said user information recording area being divided by the pre-recorded areas into a plurality of partial recording areas including a partial recording area, smaller than a unit area, in which record information of a read-only recording medium is recorded, the unit area having a size of an area on the information recording medium in which a size of data for recording or reproducing is recorded,
wherein operation-forbidding information invalidates an operation instruction by a user that is intended for the user information recorded in the partial recording areas in a reproduction period when data are recorded in the pre-recorded areas and before the reproduction period, the operation-forbidding information being written in at least one of the pre-recorded areas and an area which is outside said user information recording area,
said information recording method comprising:
a writing process of writing the user information into an area other than the pre-recorded area out of said user information recording area.

16. A non-transitory computer program product in a computer-readable medium embodying a program of instructions executable by a computer provided in an information recording apparatus, the computer program product making the computer function as at least one portion of a controlling device and a writing device,
said information recording apparatus for recording information to be recorded onto an information recording medium comprising: a user information recording area in which user information can be recorded, said user information recording area having pre-recorded areas in which recording/reproduction of the user information is prevented, said user information recording area being divided by the pre-recorded areas into a plurality of partial recording areas including a partial recording area, smaller than a unit area, in which record information of a read-only recording medium is recorded, the unit area having a size of an area on the information recording medium in which a size of data for recording or reproducing is recorded,
wherein operation-forbidding information invalidates an operation instruction by a user that is intended for the user information recorded in the partial recording areas in a reproduction period when data are recorded in the pre-recorded areas and before the reproduction period, the operation-forbidding information being written in at least one of the pre-recorded areas and an area which is outside said user information recording area,
said information recording apparatus comprising:
said writing device capable of writing the user information into said user information recording area; and
said controlling device for controlling said writing device to write the user information into an area other than the pre-recorded areas out of said user information recording area.

* * * * *